(12) United States Patent
Isnardi et al.

(10) Patent No.: US 9,210,444 B2
(45) Date of Patent: Dec. 8, 2015

(54) METHOD AND APPARATUS FOR VISION AND NETWORK GUIDED PREFILTERING

(71) Applicant: SRI International, Menlo Park, CA (US)

(72) Inventors: Michael Anthony Isnardi, Plainsboro, NJ (US); Arkady Kopansky, Feasterville, PA (US)

(73) Assignee: SRI International, Menlo Park, CA (US)

( * ) Notice: Subject to any disclaimer, the term of this patent is extended or adjusted under 35 U.S.C. 154(b) by 244 days.

(21) Appl. No.: 13/840,523

(22) Filed: Mar. 15, 2013

(65) Prior Publication Data

US 2014/0269944 A1 Sep. 18, 2014

(51) Int. Cl.
*H04N 19/89* (2014.01)
*H04N 19/80* (2014.01)
*H04N 19/115* (2014.01)
*H04N 19/117* (2014.01)
*H04N 19/164* (2014.01)
*H04N 19/17* (2014.01)

(52) U.S. Cl.
CPC ............. *H04N 19/80* (2014.11); *H04N 19/115* (2014.11); *H04N 19/117* (2014.11); *H04N 19/164* (2014.11); *H04N 19/17* (2014.11)

(58) Field of Classification Search
None
See application file for complete search history.

(56) References Cited

U.S. PATENT DOCUMENTS

| 2006/0176951 | A1 | 8/2006 | Berman et al. |
| 2010/0172404 | A1 | 7/2010 | Isnardi et al. |
| 2012/0050457 | A1* | 3/2012 | Gu .............................. 348/14.13 |

OTHER PUBLICATIONS

Dudgeon, D. and Mersereau, R., "Multidimensional Digital Signal Processing", Prenctice-Hall, Inc., 1984, 5 pages.
ISO/IEC JTC 1/SC 29/WG 11 N9577: SVC Verification Test Report, Antalya, Jan. 2008, 19 pages.

* cited by examiner

*Primary Examiner* — Dave Czekaj
*Assistant Examiner* — Nam Pham
(74) *Attorney, Agent, or Firm* — Moser Taboada (57) ABSTRACT

A method for modifying bit-rate comprising receiving bandwidth information about a network, modifying one or more parameters of a pre-filter coupled to a video encoder based on the received bandwidth information, applying the pre-filter to video content based on the modified parameters and encoding the pre-filtered video content to have a bandwidth commensurate with the bandwidth information.

20 Claims, 6 Drawing Sheets

METHOD AND APPARATUS FOR VISION AND NETWORK GUIDED PREFILTERING

BACKGROUND OF THE INVENTION

1. Field of the Invention

Embodiments of the present invention generally relate to salience based compression and video transmission and, more particularly, to a method and apparatus for vision and network guided pre-filtering of video content.

2. Description of the Related Art

When video and image data is captured by a video sensor such as a video camera, the device often saves the video and image data in a compressed format to internal or external storage, or an external video database. Oftentimes, this video content is accessed across a network by various users or end-user devices. Before the content can be shared, however, the video must be encoded by a video encoder to compress the video further in order for the network bandwidth to support the transmission of the video. The video encoder modifies the bit-rate of the content according to the available bandwidth of the network and a video decoder decodes the video for displaying on a conventional display or for storage in another database. Technologies such as vision guided compression (VGC) or salience based compression (SBC) are often used to perform compression on video content to reduce bit rate so as to reduce network bandwidth requirements by preserving important and actionable details in the original video content in salient regions at the cost of discarding "unimportant" detail in non-salient regions. However, standard VGC/SBC methods do not address a network's variable bandwidth or delivering actionable video on very low bandwidth networks and therefore video streaming may be interrupted or distorted.

Therefore, there is a need in the art for a method and apparatus for vision and network guided pre-filtering to perform video encoding for low and variable bandwidth networks.

SUMMARY OF THE INVENTION

An apparatus and/or method for vision and network guided pre-filtering, substantially as shown in and/or described in connection with at least one of the figures, as set forth more completely in the claims.

Various advantages, aspects and features of the present disclosure, as well as details of an illustrated embodiment thereof, are more fully understood from the following description and drawings.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally relate to vision and network guided pre-filtering. According to one embodiment, an encoder encodes video for transmission over a network and a decoder receives the video and decodes the video for display, storage or the like. When the bandwidth of the network varies, the decoder utilizes a feedback pathway to modify encoder and pre-filter parameters to produce video content at a lower bit-rate. The pre-filter is applied to the video content to remove more non-salient regions, and the video content is further compressed by the encoder to deliver at a bandwidth matched to the network.

Figure 1:
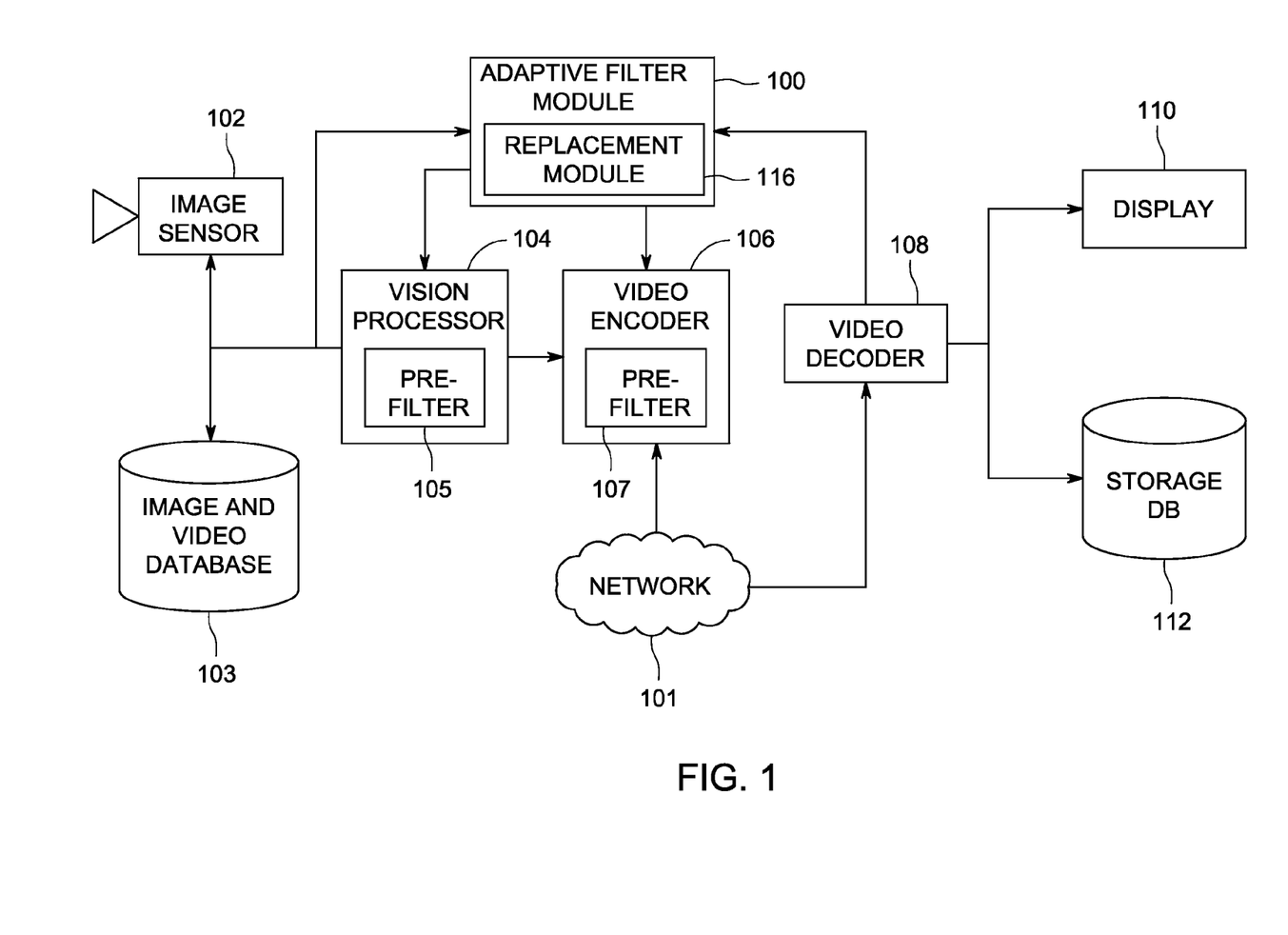
FIG. 1 depicts a functional block diagram of an adaptive filter module in accordance with exemplary embodiments of the present invention.

FIG. 1 depicts a functional block diagram of an adaptive filter module 100 in accordance with exemplary embodiments of the present invention. An image sensor 102 senses and captures video or images of a scene (not shown). The video or image content can also optionally be stored in an image and video database 103, or stored in another form of external or internal storage. The image sensor 102, for example, captures the video at a particular image size and frame rate. Video encoder 106 compresses video into such formats as MPEG-1 (H.261), MPEG-2 (H.262), MPEG-4/AVC (H.264) and MPEG HEVC (H.265), or the like. The originally captured frames may be in high definition (HD) or standard definition (SD), where even standard definition frames of a video may be several megabytes in size. The HD frames of video are significantly larger and occupy more storage space as well as require more bandwidth when being transmitted.

For example, for a video composed of SD frames, an acceptable target bit-rate may be 1-5 Mbps, whereas an HD video stream requires as much as 10-18 Mbps of network bandwidth to transmit video streams at their desired clarity. For commonly used networks such as network 101, such large bandwidth requirements may be impractical and therefore, a vision processor 104 is embedded between the image sensor 102 and a video encoder 106. Typical networks may include RF channels which have an approximate bandwidth of approximately 20 Megabits per second (Mbps), IP networks which have an approximate bandwidth of 0.1 to 5 Mbps, and the like.

The vision processor 104 further comprises a pre-filter 105. The vision processor 104 applies vision guided pre-filtering (VGP)/salience based pre-filtering (SBP) to the video content to facilitate automatic reduction of the bit-rate of the video content without losing important detail. The vision pre-filter 105 performs salience based pre-filtering or other functions on the video content. For example, if the video content contains two moving objects on a background, the moving objects are detected and regarded as salient, and the background is considered non-salient.

The non-salient regions are then filtered, by various filters such as a Gaussian filter, a boxcar filter, a pillbox filter, or the like, removing a significant amount of unimportant detail that would have required many bits to encode. For further detail regarding SBC/VGC, please see commonly assigned and co-pending U.S. patent application Ser. No. 12/644,707 entitled "High-Quality Region-Of-Interest Compression using commercial Off-The-Shelf encoders", filed on Dec. 22, 2009, hereby incorporated by reference in its entirety.

The video encoder 106 encodes the compressed video content using the compression standards mentioned above, such as MPEG2/MPEG4, or the like. The video encoder 106 may further comprise a pre-filter 107 which performs pixel-level filtering, but does not take into account salient attributes of the video content, as opposed to the vision processor 104, which does. The video encoder 106 is a standard, off-the-shelf video encoder. The video encoder encodes the video in order to transmit the video at a particular bit-rate over the network 101.

In order for the video content to be viewed, it must first be decoded by the video decoder 108. As with the video encoder 106, the video decoder 108 is a standard off-the-shelf video decoder capable of decoding standard video formats such as MPEG2/MPEG4, or the like. Once the decoder decodes the video content, the content is streamed or transmitted to a display 110, or to a storage database 112. According to other embodiments, the video decoder 108 can couple the video content with any end user consuming device such as a tablet, a mobile phone, a television, or the like.

In some instances, the network 101 may experience slow-down because of other users, or various environmental conditions. In other instances, the network 101 may be a low bandwidth network such as those available in the field. In these instances, more aggressive encoding of video content is highly desired to decrease bit-rate and keep video content streaming continuously without losing actionability, and maintaining the visibility of spatially salient regions of the video content.

In a closed network, a feedback path is present between the video decoder 108 and the vision processor 104. The video decoder 108 receives information about network bandwidth changes and couples with the adaptive filter module 100 to send a message to the vision processor 104 about the changed network bandwidth.

The adaptive filter module 100 then determines how the vision processor 104 and the pre-filter 105 will be modified to increase or decrease the bit-rate depending on whether the network bandwidth has increased or decreased, respectively. The adaptive filter module 100 may, according to one embodiment, request that the pre-filter 105 modify the type of filter being applied, for example, a boxcar, a Gaussian filter or a pillbox filter. According to other embodiments, the filter size and/or frequency response is modified. For example, a smaller or larger region is filtered according to the bit-rate requirements. According to another embodiment, the number of salient objects being filtered is modified according to location, size of objects, amount of motion, or the like. According to yet another embodiment, the adaptive filter module 100 requests that the vision processor 104 and the pre-filter 105 vary the rate in which the filter is applied to salient objects. The degree of low-pass filtering applied to non-salient pixels in a frame greatly affects the bit rate. For a given low-pass filter shape, the degree of filtering increases with filter size.

For example, for a box-car filter applied to video processed by a binary salience map drastically reduces the bit-rate as the filter increases in size. For example, a 640×480 pixel video running at 30 frames per second is filtered with a boxcar filter and encoded in "constant quality" mode using H.264/MPEG-4 AVC video compression. In constant quality mode, the quantization parameter (QP) stays fixed, and bits are produced in proportion to the underlying entropy of the video signal. As QP increases, more transform coefficients are quantized to zero, and fewer coded bits per image block are produced. Major drops in bit rate, independent of QP, occur as the boxcar size increases from 1×1 to 5×5, with diminishing returns thereafter. Boxcar sizes larger than 9×9 show almost no additional drop in bit rate, for typical video content. The resulting bit rate is approximated as a weighted average of the two extremal bit rates produced when all pixels are filtered by each of the filters individually:

$$BR = W * BR_{max} + (1-W) * BR_{min} \qquad (1)$$

where $BR_{max}$ is the bit rate produced by filtering all pixels with the salient, on "inside", filter; $BR_{min}$ is the bit rate produced by filtering all pixels with the non-salient, on "outside", filter; and W, the weighting parameter, is equal to the fraction of salient pixels in the frame. In this example, when video is filtered with a 1×1 boxcar (i.e., is not filtered at all) and encoded in constant quality mode with QP=20, the resulting bit rate is $BR_{max}$=8 Mbps. When the same video is filtered with an 11×11 boxcar and encoded in constant quality mode with QP=20, the resulting bit rate is $BR_{min}$=1 Mbps. When the fraction of salient pixels in the frame is 10% (W=0.1), the resulting bit rate is approximately BR=0.1*8+0.9*1=1.7 Mbps. As W approaches 1.0, BR approaches $BR_{max}$; as W approaches 0.0, BR approaches $BR_{min}$.

Accordingly, increasing the filter size lowers the bit rate. For instance, if the channel bit rate is 3 Mbps, a 3×3 boxcar filter is used; however, if the channel bit rate drops to 1 Mbps, an 11×11 boxcar filter is selected. Doing so increases the blur of the non-salient pixels but minimally affects the quality of the salient pixels.

Generally speaking, the bit rate can be modeled as the following exponential function of filter size:

$$r(s) = a \cdot \exp(-bs) + c \qquad (2)$$

where exp( ) is the exponential function, r is the rate in bits per second (bps), s is the filter size (in pixels) and a, b, and c are known, non-negative, measured constants that are a function of image format and content. For a two-level salience map, the rate R produced by filtering some non-negative fraction $\alpha_1$ of the pixels with size $s_1$ and the complementary non-negative fraction $\alpha_2 = 1 - \alpha_1$ with size $s_2$ is given by:

$$R = \alpha_1 r(s_1) + \alpha_2 r(s_2) = [\alpha_1 \cdot a \cdot \exp(-bs_1) + c] + [\alpha_2 \cdot a \cdot \exp(-bs_2) + c] \qquad (3)$$

We know R, $\alpha_1$, $\alpha_2$, a, b and c, so the equation reduces to $$C = \alpha_1 x_1 + \alpha_2 x_2 \qquad (4)$$

where C=(R−2c)/a and $xi = \alpha_i \cdot \exp(-bs_i)$ for i=1, 2. This is a linear equation in $x_1, x_2$ so any two values satisfying the equation can be picked. Once they are picked, the filter sizes are obtained as follows:

$$s_i = -\ln(x_i/\alpha_i)/b \text{ for } i=1,2 \qquad (5)$$

where ln( ) is the natural log function. In practice, $s_i$ would be rounded to the nearest integer. Although this formulation is for the two-level saliency case (N=2), it is straightforward to generalize this method to the N-level saliency case, where N>2. Filter sizes and filter kernels can either be generated adaptively or pre-computed and stored in a look-up table stored in the adaptive filter module 100. According to an exemplary embodiment, filter sizes increase as network bandwidth decreases, and less filtering is done in salient regions compared to non-salient regions.

According to other embodiments, the adaptive filter module 100 may also comprise a replacement module 116, which may be directly coupled with the image sensor 102, the image and video database 103, the vision processor 104 an the video encoder 106. In some instances, the replacement module 116 can be used independently of the adaptive filter module 100.

According to one embodiment, the replacement module 116 receives video content from the image sensor 102, for example, and analyzes frame to frame movement in the captured video content. In scenes where the sensor 102 view is relatively fixed, but there is some movement of the sensor 102, video stabilization is initially performed in order to align the frames in the video content. Once the frames are aligned, the replacement module 116 analyzes frame to frame pixel differences in the video content and determines the pixels which remain static in the sense that they do not need to be changed in each frame.

The replacement module 116 then selectively copies the pixels found in the initial frame to the other frames which share an overlapping view of the initial frame. When the video encoder 106 directly performs compression on the selectively modified video content, it achieves better compression ratio than on the unmodified video because each of the frames are largely composed of the identical pixels, excluding any moving object pixels. The highly compressed video content can therefore be transmitted over low bandwidth networks. The video is decoded by video decoder 108 and displayed on display 110 with most of the background remaining static while only foreground, or salient, objects are in motion.

According to some embodiments, the frame-to-frame pixel operations can be achieved by stabilizing, ortho-rectifying, warping the imagery (including parallax correction) and ensuring that the overlapping pixels corresponding to the background do not change from frame to frame. Because of the predictive nature of all modern video codecs, including, but not limited to, MPEG-2, H.263, H.264, and High Efficiency Video Coding (HEVC) standard, the bit rate for the compressed video will be noticeably reduced compared to the video that has not been pre-processed due to the fact that, except for small overhead to convey static areas, bits will only need to be spent on coding the moving objects.

According to further embodiments, if a field of view of two or more frames does not differ or substantially overlaps, any areas containing identical pixels can be located and copied from frame to frame, regardless of whether the pixels are considered foreground or background objects, salient or non-salient objects. For example, if an object is moving in the video content, but the pixels corresponding to the object do not differ from frame to frame in terms of their color/shape, then those pixels may also be replaced with a simple copy and paste operation from an earlier frame into the new location(s) for the subsequent frame(s).

Figure 2:
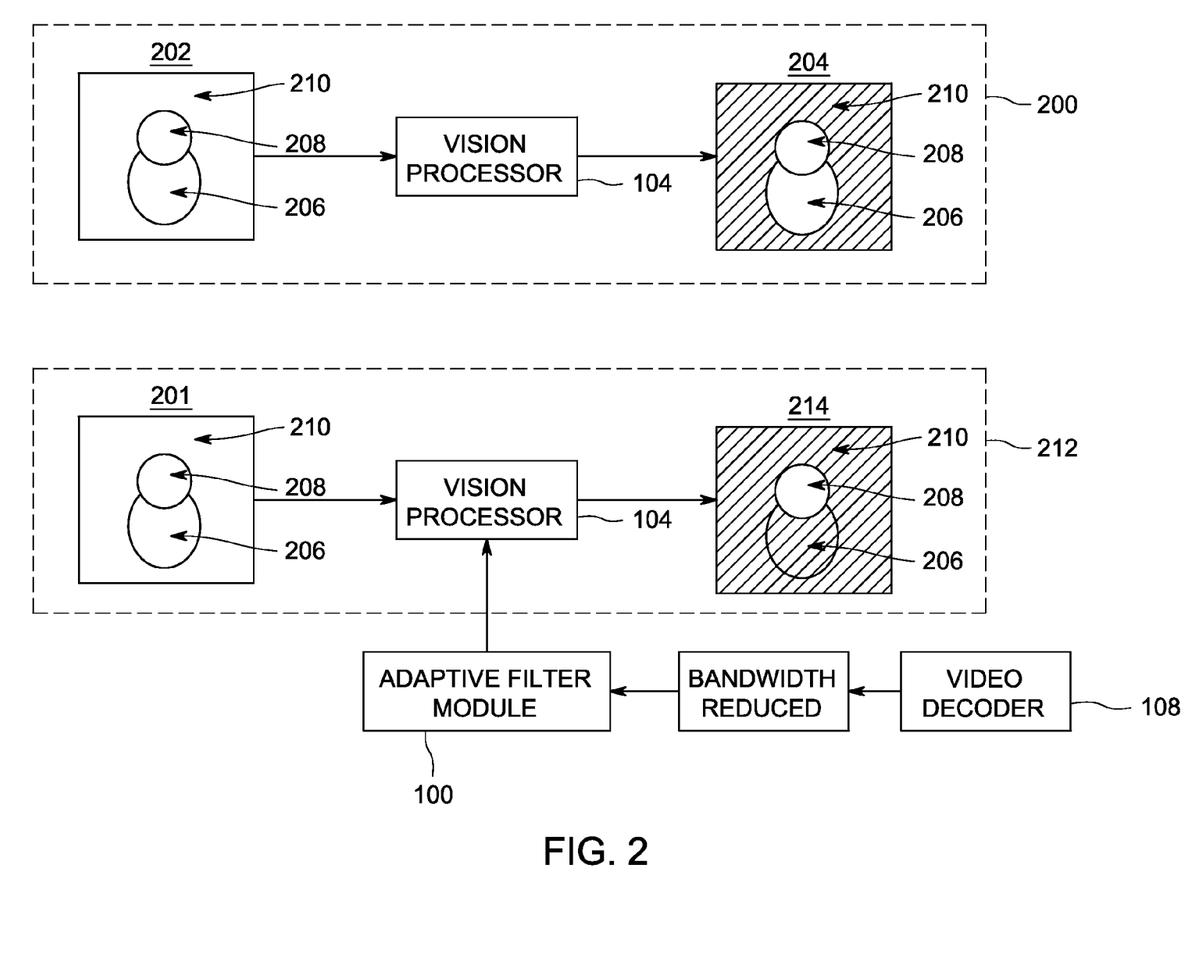
FIG. 2 is an illustration of the impact of the adaptive filter module on a sample frame of video content in accordance with an exemplary embodiment of the present invention.

FIG. 2 is an illustration of the impact of the adaptive filter module 100 on a sample frame of video content in accordance to an exemplary embodiment of the present invention. Illustration 200 depicts the typical scenario where an image frame 202 comprises a torso 206, a head 208 and a background 210. The vision processor 104 is applied to the frame of the video content to produce a salience detected image where the torso 206 and the head 208 are determined as salient and the background 210 is determined as non-salient. The background 210 has had a filter applied to it, for example, a Gaussian blur, in order to reduce the amount of detail shown, whereas the torso 206 and the head 208 are maintained at their current fidelity or sharpened.

However, when the adaptive filter module 100 receives notification that the bandwidth has been reduced from the video decoder 108, the vision processor 104 behaves differently. According to this embodiment, illustration 207 shows the same frame 201 being processed by the vision processor 104, but the output image 214 has produced only one salient object: the head 208. The vision processor has filtered the torso 208 and the background 210 by, according to one embodiment, reducing the number of salient objects to be produced by the vision processor 104, where the only salient object is the face 208. In this embodiment, when the decoder decodes the video content and displays the frame 214 on a display, the body and background will be blurred and the foreground face 208 will be sharp. When the network bandwidth increases, then the adaptive filter module 100 will, for example, increase the number of salient objects again resulting in torso 206 and body 208 being shown.

Figure 3:
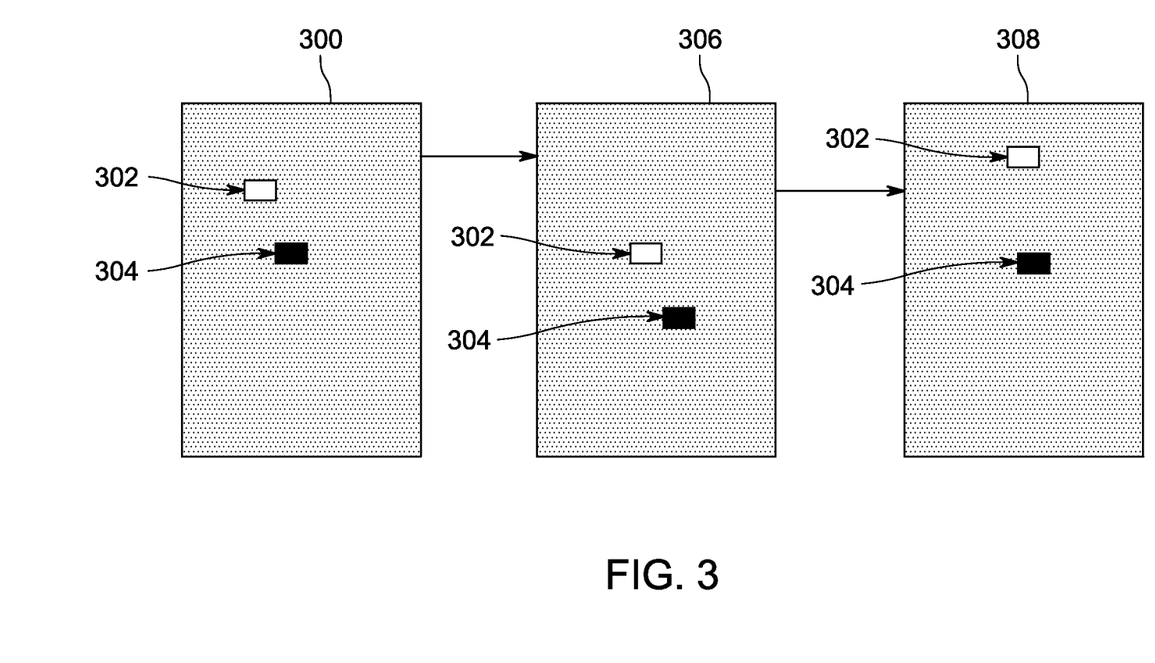
FIG. 3 is an illustration of the result of the replacement module in accordance with exemplary embodiments of the present invention.

FIG. 3 is an illustration of the result of the replacement module 116 in accordance with exemplary embodiments of the present invention. Frame 300, frame 306 and frame 308 have two common objects, object 302 and object 304. In addition, the background of each frame is essentially the same in terms of pixel coloration and the like. The replacement module 116 identifies that the only changes in pixels are the position of object 302 and object 304 as they move around the background area, but the background remains static because the replacement module 116 uses pixels of the background in frame 300 and copies them to frame 306 and 308.

According to other embodiments of the present invention, the replacement module 116 further may be given the information that the objects 302 and 304 are the same objects in frame 306 and 308. The replacement module 116 can make a further change and copy the pixels of object 302 and 304 from frame 306 and paste those same pixels in frame 306 and 308 at their correct new positions. Therefore, when the encoder 106 performs encoding, compression will be greatly increased and bit-rate will be significantly reduced because frame 306 and frame 308 have nearly the same pixels as frame 300.

Figure 4:
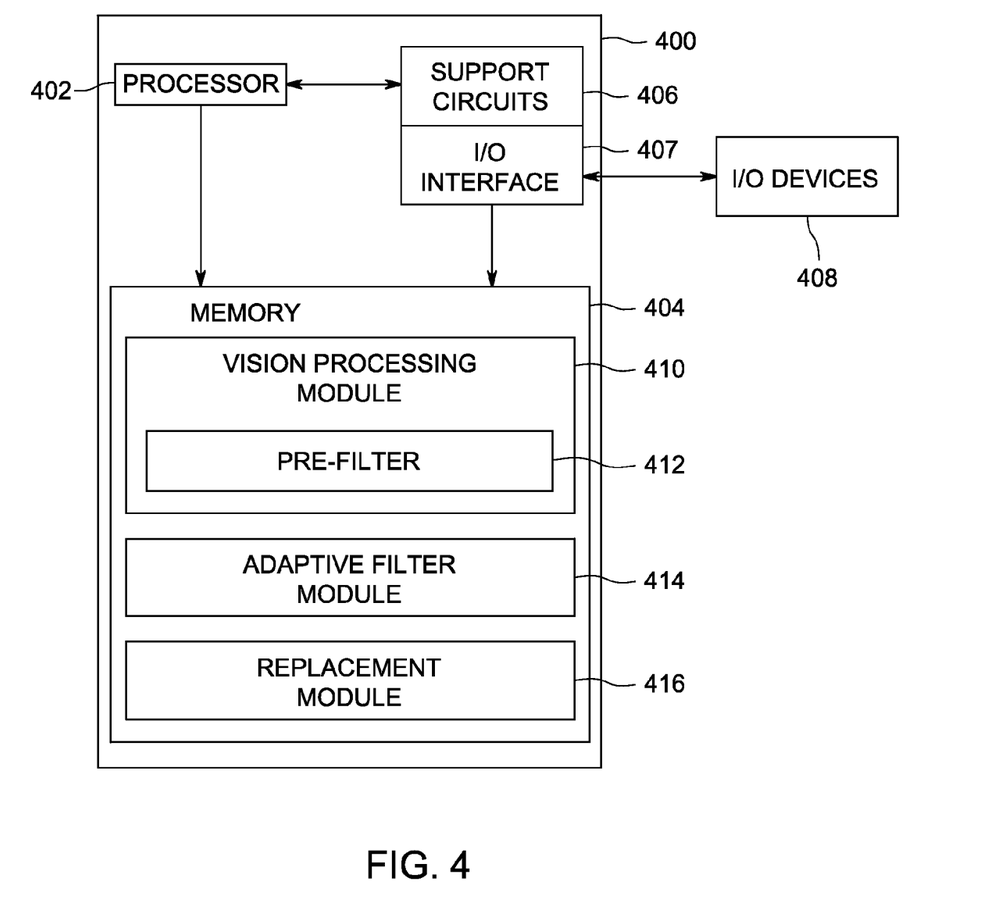
FIG. 4 depicts a computer in accordance with at least one embodiment of the present invention.

FIG. 4 depicts a computer 400 in accordance with at least one embodiment of the present invention. The computer 400 includes a processor 402, various support circuits 406, and memory 404. The processor 402 may include one or more microprocessors known in the art. The support circuits 406 for the processor 402 include conventional cache, power supplies, clock circuits, data registers, I/O interface 407, and the like. The I/O interface 407 may be directly coupled to the memory 404 or coupled through the supporting circuits 406. The I/O interface 407 may also be configured for communication with input devices and/or output devices such as network devices, various storage devices, mouse, keyboard, display, video and audio sensors, IMU and the like.

The memory 404, or computer readable medium, stores non-transient processor-executable instructions and/or data that may be executed by and/or used by the processor 402. These processor-executable instructions may comprise firmware, software, and the like, or some combination thereof. Modules having processor-executable instructions that are stored in the memory 404 comprise a vision processing module 410, an adaptive filter module 414 and a replacement module 416. The vision processing module 410 further comprises a pre-filter 412. According to some embodiments, the replacement module 416 may be a portion of the adaptive filter module 414.

The computer 400 may be programmed with one or more operating systems (generally referred to as operating system (OS)), which may include OS/2, Java Virtual Machine, Linux, SOLARIS, UNIX, HPUX, AIX, WINDOWS, WINDOWS95, WINDOWS98, WINDOWS NT, AND WINDOWS2000, WINDOWS ME, WINDOWS XP, WINDOWS SERVER, WINDOWS 8, Mac OS X, IOS, ANDROID among other known platforms. At least a portion of the operating system may be disposed in the memory 404.

The memory 404 may include one or more of the following random access memory, read only memory, magneto-resistive read/write memory, optical read/write memory, cache memory, magnetic read/write memory, and the like, as well as signal-bearing media as described below.

Figure 5:
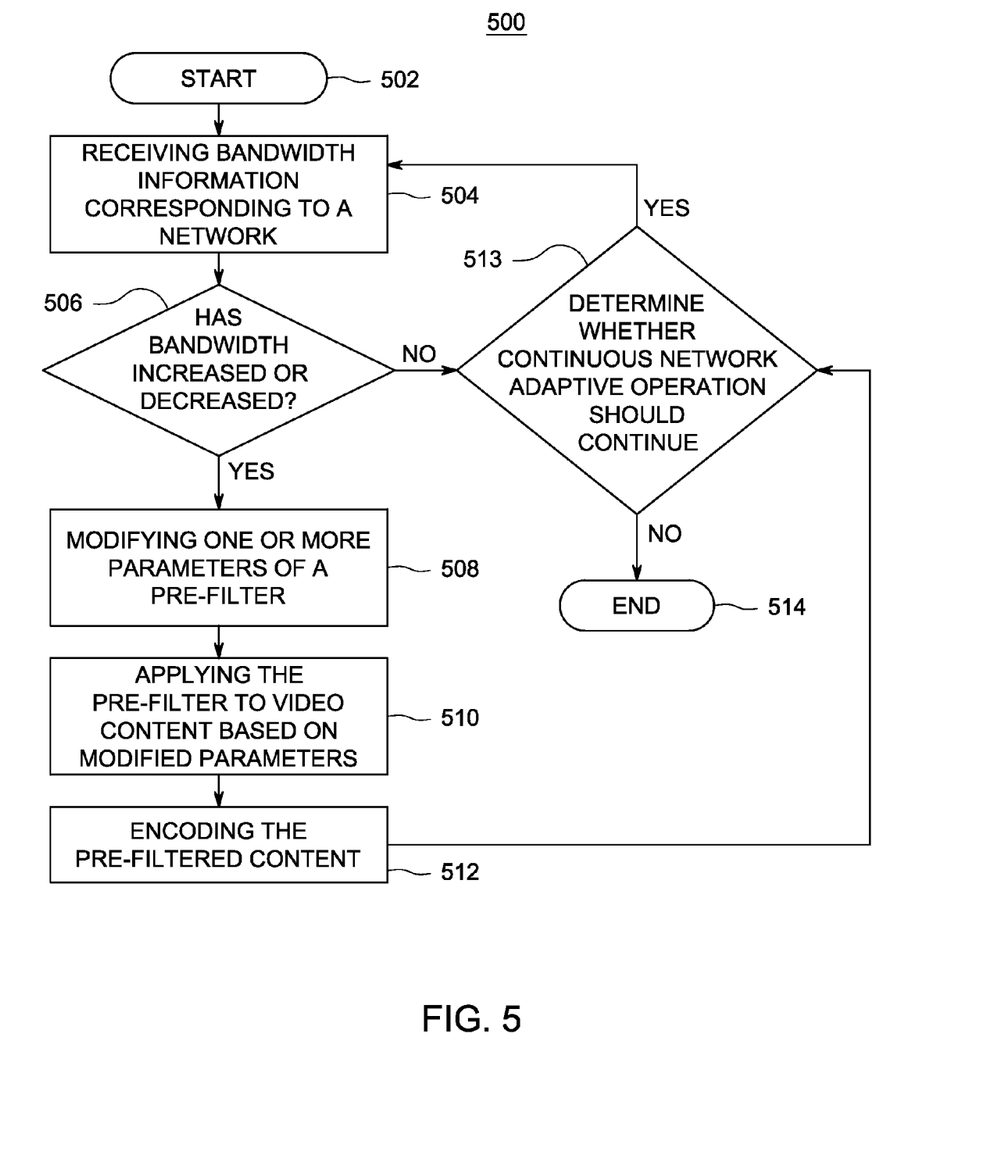
FIG. 5 depicts a flow diagram of a method for modifying bit-rate of video content in accordance with embodiments of the present invention.

FIG. 5 depicts a flow diagram of a method 500 for modifying bit-rate of video content in accordance with embodiments of the present invention. The method 500 is an implementation of the adaptive filter module 414 and the vision processing module 410 as executed by the processor 402 by the computer system 400 as shown in FIG. 4.

The method begins at step 502 and proceeds to step 504. At step 504, the adaptive filter module 414 receives information corresponding to network bandwidth from a video decoder. According to some embodiments, the video decoder transmits information about changes in the bandwidth. According to other embodiments, the video decoder transmits network bandwidth information continuously, and the adaptive filter module 414 behaves accordingly.

The method proceeds to step 506, where the adaptive filter module 414 determines whether bandwidth has increased or decreased, i.e., whether bandwidth has changed. If bandwidth has not changed, the method ends at step 514. If the adaptive filter module 414 determines that bandwidth has increased or decreased, the method proceeds to step 508. At step 508, the method 500 modifies one or more parameters of pre-filter 412 of the vision processing module 410. As described above, the pre-filter may be a low-pass filter for performing functions such as blurring based on salient object determination by the vision processing module 410.

The vision processor 410 then applies the pre-filter 412 to video content being transmitted at step 510, based on the modified parameters to reduce the bit-rate of the video content. For example, if the bandwidth of the network had decreased, the adaptive filter module 414 modifies increases the filter size so as to drive down the bit-rate. At step 510, an encoder, such as the video encoder 106, encodes the video applying a compression scheme such as MPEG2, MPEG 4, or the like. At step 513, the method 500 determines whether continuous network adaptive operation should proceed, and if continuous network adaptive operation should proceed, the method 500 returns to step 504. If, at step 513, there is a request to terminate the method 500, the method 500 then terminates at step 514.

Figure 6:
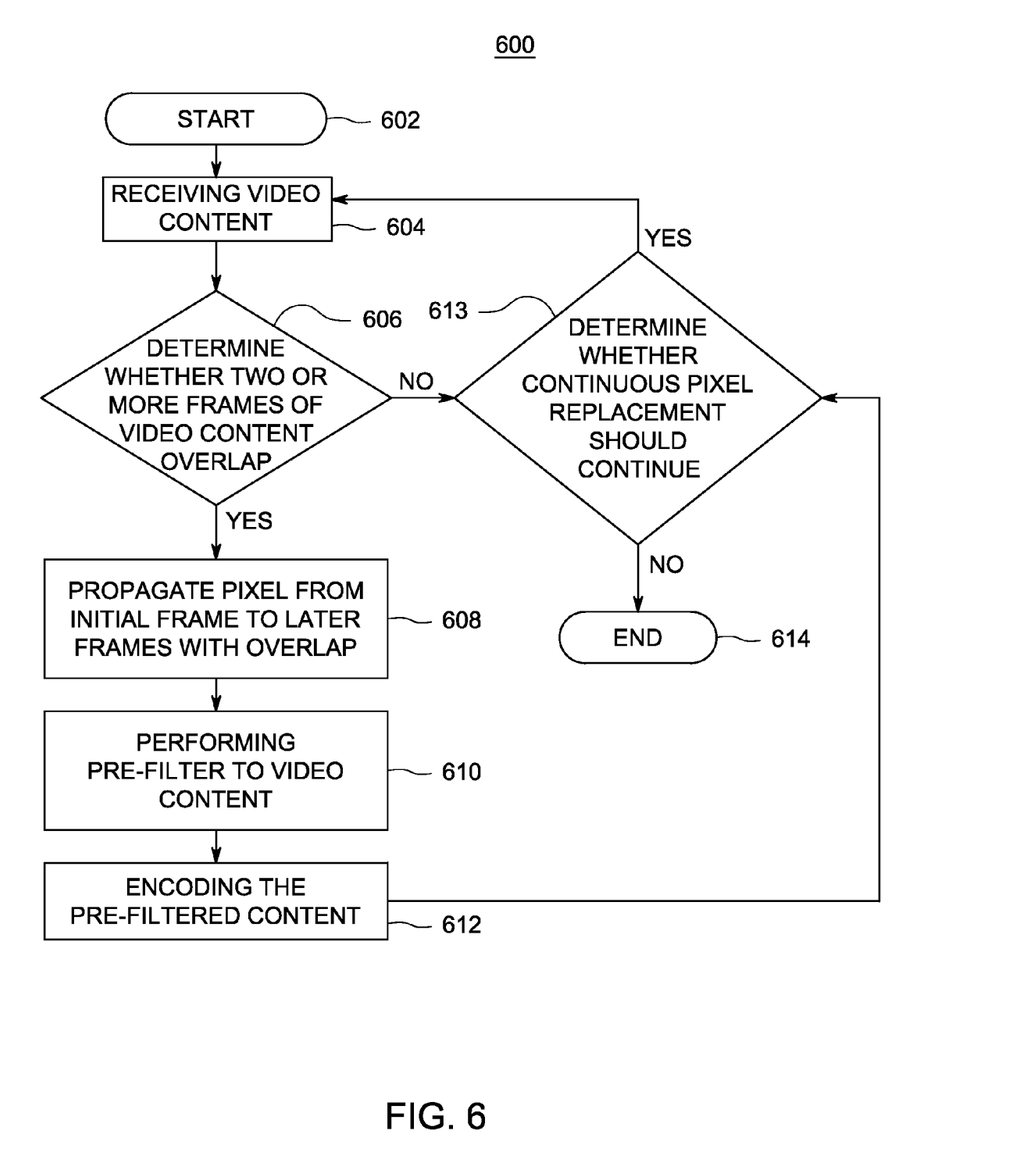
FIG. 6 depicts a flow diagram of a method for modifying bit-rate of video content in accordance with embodiments of the present invention.

FIG. 6 depicts a flow diagram of a method 600 for modifying bit-rate of video content in accordance with embodiments of the present invention. The method 600 is an implementation of the replacement module 416, the adaptive filter module 414 and the vision processing module 410 as executed by the processor 402 by the computer system 400 as shown in FIG. 4.

The method begins at step 602 and proceeds to step 604. At step 604, replacement module 416 receives video content. At step 606, the replacement module 416 determines whether in two or more frames of the video content, whether a field of view overlaps, or significant amounts of pixels overlap. For example, the replacement module 416 may use various means to detect one or more objects 302 and 304 in frame 300 as shown in FIG. 3, as well as a similar background in frames 300, 306 and 308.

At step 608, the replacement module 416 copies the pixels of the initial frames, for example, Frame 300 of FIG. 3, of the video content to the later frames in the video content in which field of view, content, or background overlap, such as frames 306 and 308 of FIG. 3. At step 610, the vision processor 410 applies the pre-filter 412 to the received video content. The video encoder 106, for example, performs video encoding on the video content at step 612. At step 613, the method 600 determines whether continuous pixel replacement should continue. If it is determined that pixel replacement should continue, the method returns to step 604, otherwise, the method terminates ate step 614.

Various elements, devices, modules and circuits are described above in association with their respective functions. These elements, devices, modules and circuits are considered means for performing their respective functions as described herein. While the foregoing is directed to embodiments of the present invention, other and further embodiments of the invention may be devised without departing from the basic scope thereof, and the scope thereof is determined by the claims that follow.

The invention claimed is:

1. A method for vision and network guided pre-filtering of video content comprising:
   receiving bandwidth information about a network via a feedback path;
   modifying one or more parameters of a pre-filter coupled to a standard video encoder based on the received bandwidth information, the video encoder configured to encode video at a bit-rate commensurate with activity in a region of the video content; and
   applying the pre-filter to video content based on the modified one or more parameters to generate pre-filtered video content, wherein the pre-filter facilitates saliency based compression by recognizing salient regions and non-salient regions in the original video content; and
   wherein salient regions in the pre-filtered video content are automatically encoded at a higher bit-rate than non-salient regions.

2. The method of claim 1 further comprising:
   wherein the parameters comprise at least one of filter type, filter size, filter response, number of salient objects or rate of filter application to the salient objects.

3. The method of claim 2 further comprising:
   modifying the filter type between one of boxcar, Gaussian or pillbox filters.

4. The method of claim 2 further comprising:
   performing one or more of increasing the filter size and reducing a lowpass cutoff frequency of the filter to a predetermined limit when the bandwidth decreases in order to decrease a bit-rate of the video content; and
   performing one or more of decreasing the filter size and increasing the lowpass cutoff frequency of the filter when the bandwidth increases in order to increase a bit-rate of the video content.

5. The method of claim 2 further comprising:
   increasing the number of salient objects when bandwidth of the network increases to increase a bit-rate of the video content; and
   decreasing the number of salient objects when the bandwidth decreases to decrease a bit-rate of the video content.

6. The method of claim 1 further comprising:
   determining whether non-salient regions of the original video content remain nearly static; and
   replacing pixels in the non-salient region in the original video content from frame to frame with pixels from an initial frame in the video content before pre-filtering the video content.

7. The method of claim 6 wherein replacing pixels further comprising:

performing one or more of frame to frame ortho-rectification, frame stabilization, frame warping to ensure pixels corresponding to non-salient regions are unchanging from frame to frame in the video content.

8. The method of claim 6 further comprising:
performing background stabilization of the video content before determining whether non-salient regions of the video content remain nearly static.

9. The method of claim 1 wherein the encoding is performed by a standard off-the-shelf encoder.

10. An apparatus for vision and network guided pre-filtering of video content comprising:
an adaptive filter module, coupled to a video sensor, for receiving bandwidth information about a network via a feedback path and modifying one or more parameters of a pre-filter coupled to a video encoder based on the received bandwidth information, the video encoder configured to encode video content at a bit-rate commensurate with activity in a region of the video content; and
a vision processor, coupled to the adaptive filter module, for applying the pre-filter to video content based on the modified one or more parameters, wherein the pre-filter facilitates saliency based compression by recognizing salient regions and non-salient regions in the video content,
wherein salient regions in the pre-filtered video content are automatically encoded at a higher bit-rate than non-salient regions.

11. The apparatus of claim 10 further comprising:
wherein the parameters comprise at least one of filter type, filter size, filter response, number of salient objects and rate of filter application to salient objects.

12. The apparatus of claim 11 wherein the adaptive filter module is further configured for modifying the filter type between one of boxcar, Gaussian or pillbox filters.

13. The apparatus of claim 11 wherein the adaptive filter module is further configured for:
performing one or more of increasing the filter size and reducing a lowpass cutoff frequency of the filter to a predetermined limit when bandwidth of the network decreases in order to decrease a bit-rate of the video content; and
performing one or more of decreasing the filter size and increasing the lowpass cutoff frequency of the filter when the bandwidth increases in order to increase a bit-rate of the video content.

14. The apparatus of claim 11 wherein the adaptive filter module is further configured for:
increasing the number of salient objects when bandwidth of the network increases to increase a bit-rate of the video content; and
decreasing the number of salient objects when the bandwidth decreases to decrease a bit-rate of the video content.

15. The apparatus of claim 10 wherein the video encoder is a standard off-the-shelf encoder.

16. A non-transitory computer-readable medium containing program instructions for causing a computer to perform a method comprising:
receiving bandwidth information about a network via a feedback path; modifying one or more parameters of a pre-filter coupled to a standard video encoder based on the received bandwidth information, the video encoder configured to encode video content at a bit-rate commensurate with activity in a region of the video content; and
applying the pre-filter to video content based on the modified one or more parameters to generate pre-filtered video content, wherein the pre-filter facilitates saliency based compression by recognizing salient regions and non-salient regions in the video content; and
wherein salient regions in the pre-filtered video content are automatically encoded at a higher bit-rate than non-salient regions.

17. The computer-readable medium of claim 16, wherein the parameters comprise at least one of filter type, filter size, filter response, number of salient objects and rate of filter application to salient objects.

18. The computer-readable medium of claim 17 wherein the method further comprises:
performing one or more of increasing the filter size and reducing a lowpass cutoff frequency of the filter to a predetermined limit when bandwidth of the network decreases in order to decrease a bit-rate of the video content; and
performing one or more of decreasing the filter size and increasing the lowpass cutoff frequency of the filter when the bandwidth increases in order to increase a bit-rate of the video content.

19. The computer-readable medium of claim 17 wherein the method further comprises:
increasing the number of salient objects when bandwidth of the network increases to increase a bit-rate of the video content; and
decreasing the number of salient objects when the bandwidth decreases to decrease a bit-rate of the video content.

20. The computer-readable medium of claim 16 wherein the encoding is performed by a standard off-the-shelf encoder.

* * * * *